United States Patent [19]

Tabata et al.

[11] Patent Number: 4,484,200

[45] Date of Patent: Nov. 20, 1984

[54] NON-IMPACT RECORDING APPARATUS

[75] Inventors: Yukio Tabata; Toshiyuki Kawanishi, both of Numazu, Japan

[73] Assignee: Ricoh Company, Ltd., Tokyo, Japan

[21] Appl. No.: 390,759

[22] Filed: Jun. 21, 1982

[30] Foreign Application Priority Data

Jun. 19, 1981 [JP] Japan ................................. 56-9428

[51] Int. Cl.³ ..................... G01D 15/10; G01D 15/24; B41J 3/20
[52] U.S. Cl. ............................ 346/76 PH; 346/135.1; 400/120
[58] Field of Search ...................... 346/76 PH, 135.1; 400/120

[56] References Cited

U.S. PATENT DOCUMENTS 3,719,261  3/1973  Heinzer et al. ............ 346/76 PH X
3,744,611  7/1973  Montanai et al. .......... 346/76 PH X

OTHER PUBLICATIONS

Wilbur, C. V., Electrothermal Print Head, IBM Technical Disclosure Bulletin, Feb. 1981, vol. 23, No. 9, 4305-4306.

Primary Examiner—George H. Miller, Jr.
Attorney, Agent, or Firm—Guy W. Shoup; Gerard F. Dunne

[57] ABSTRACT

In a non-impact recording apparatus comprising (i) a recording head comprising (a) a recording electrode consisting essentially of a plurality of recording styli, and (b) a return electrode, which are embedded in an electrically insulating support member, and (ii) an image-delineating signal application apparatus which applies image-delineating electric current between selected recording styli and the return electrode so as to generate Joule's heat in the portions in an ink ribbon containing an electroconductive thermo-fusible ink material immediately below the recording styli and to soften the ink material, thereby transferring the softened or fused ink material in image patterns to a recording medium, the improvement wherein, on the side of the recording head in contact with the surface of the ink ribbon, there is formed a groove portion out of contact with the surface of the ink ribbon between the recording electrode and the return electrode, thereby preventing the deposition of a layer of the electroconductive ink material between the recording electrode and the return electrode.

11 Claims, 11 Drawing Figures

NON-IMPACT RECORDING APPARATUS

BACKGROUND OF THE INVENTION

The present invention generally relates to a non-impact recording apparatus for recording images on a recording medium by placing an ink ribbon containing an electroconductive thermo-transferable ink material over the recording medium and applying an image signal voltage to the ink ribbon through a recording electrode and a return electrode which are in contact with the surface of the ink ribbon, thereby softening the ink material in an image pattern by the heat generated within the ink ribbon by the application of the image signal voltage, and transferring the softened ink material to the recording medium. More particularly, it relates to a non-impact recording apparatus of the above-mentioned type, wherein the recording electrode and the return electrode are embedded in an electrically insulating support member, thereby forming a recording head with the recording electrode and the return electrode exposed and directed towards the surface of the ink ribbon, and with the improvement wherein the portion between the exposed recording electrode and the exposed return electrode is in the shape of a groove and out of contact with the surface of the ink ribbon, thereby preventing the adhesion of the electroconductive thermo-transferable ink material material released from the ink ribbon to the portion between those two electrodes of the recording head.

Conventionally, in a recording head of the above-described type, the portion with the recording electrode and the return electrode embedded in contact with the ink ribbon is flat. In this recording head, the electroconductive thermal-transferable ink material adheres to the flat portion of the recording head while in use, forming an electroconductive layer thereon. As a result, it occurs that more electric current flows through the electroconductive ink layer on the recording head (the shortest route between the electrodes) than through the ink ribbon, so that the quality of the non-impact recording is significantly degraded or in fact becomes impossible.

SUMMARY OF THE INVENTION

It is therefore an object of the present invention to provide a non-impact recording apparatus capable of delivering high image quality continuously in operation by preventing the adhesion of the electroconductive ink material released from an ink ribbon to a recording head.

According to the present invention, this object is attained by a non-impact recording apparatus including a recording head which comprises a recording electrode consisting essentially of a plurality of recording styli arranged in a row or rows, a return electrode, and a support member made of an electrically insulating material for supporting integrally the recording electrode and the return n of the support member between the recording electrode is held and the return electrode out of contact with the surface of the ink ribbon, thereby preventing the formation of a layer of electroconductive ink material between the two electrodes. An image-delineating signal application apparatus is provided which applies image-delineating electric current between selected recording styli of the recording electrode and the return electrode so as to generate Joule's heat in the portions of the ink ribbon immediately below the recording styli and to soften the ink material in image patterns, thereby transferring the softened or fused ink material of the ink ribbon to a recording medium in image patterns.

DETAILED DESCRIPTION OF THE PREFERRED EMBODIMENTS

Figure 1:
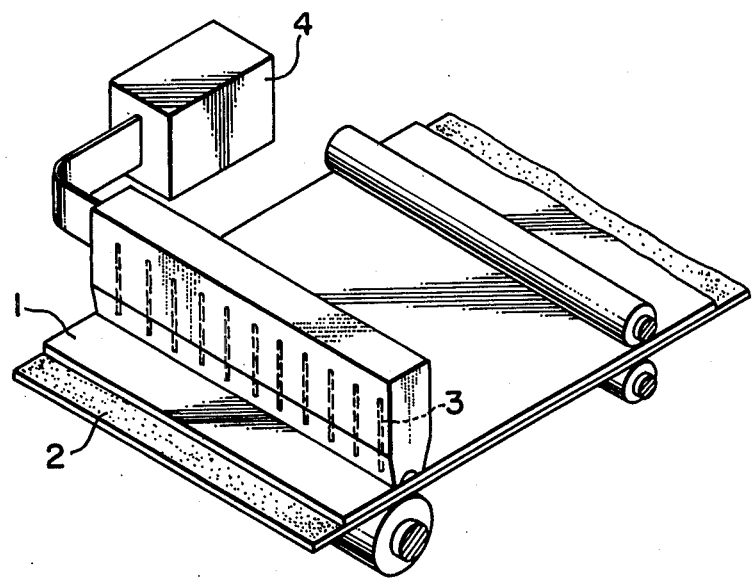
FIG. 1 is a partially cut-away perspective view of an embodiment of a non-impact recording apparatus according to the present invention.

Referring to FIG. 1, there is shown a partially cut-away perspective view of an embodiment of a non-impact recording apparatus according to the present invention. In the figure, reference numeral 1 indicates an ink ribbon containing an electroconductive thermal-transferable ink material which can be transferred to a recording medium 2 by the Joule's heat generated in the ink ribbon 1 upon application of an image-delineating electric current thereto. As shown in the figure, the recording medium 2 is placed below the ink ribbon 1 in close contact therewith.

This non-impact recording apparatus comprises a recording head and an image-delineating current signal application apparatus 4.

Figure 2:
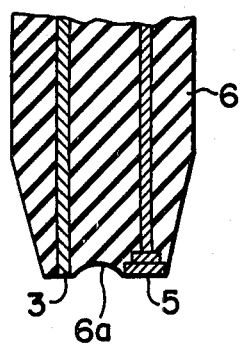
FIG. 2 is a sectional view of an example of a recording head comprising a recording electrode and a return electrode for use in the non-impact recording apparatus shown in FIG. 1.
Figure 3:
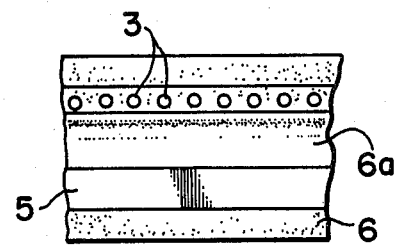
FIG. 3 is a partial cut-away bottom view of the recording head shown in FIG. 2.

FIG. 2 is a sectional view of the recording head. FIG. 3 is a partial cut-away bottom view of the recording head. As shown in these figures, the recording head comprises a recording electrode 3 consisting essentially of a plurality of recording styli arranged in a row, a return electrode 5, and a support member 6 made of an electrically insulating material for supporting integrally the recording electrode 3 and the return electrode 5 with a predetermined distance therebetween. The key feature of this recording head is that there is formed a groove 6a between the recording electrode 3 and the return electrode 5, so that the portion between the two electrodes 3 and 5 is always out of contact with the ink ribbon 1.

In operation, when image-delineating signals are applied between the recording electrode 3 and the return electrode 5, the corresponding image-delineating current flows through the ink ribbon 1. Since the contact area with the ink ribbon 1 of the return electrode 5 is significantly greater (at least five times greater) than the total contact area with the ink ribbon 1 of the recording styli of the recording electrode 3, and, of course, greater than the contact area with the ink ribbon 1 of each recording stylus, and since the same amount of electric current flows through the recording electrode 3 as through the return electrode 5, the current density in the portion of the ink ribbon 1 immediately below each recording stylus is extremely greater than the current density in the portion of the ink ribbon 1 immediately below the return electrode 5. Therefore, in comparison with the Joule's heat generated below the return electrode 5, an extremely great amount of the Joule's heat is generated below the recording styli of the recording electrode 3. As a result, by selection of electroconductive thermal-transferable ink with an appropriate melting point, and by supplying an appropriate amount of electric current, only the electroconductive thermal-transferable ink material present immediately below the recording styli 6 is fused by the Joule's heat and is then transferred in the form of dots to the recording medium 2, in image patterns corresponding to the image-delineating signals applied by the image-delineating signal application apparatus 4.

In the above-described recording process, the electroconductive thermo-fusible ink material is transferred to the recording medium 2, and, as a matter of course, that ink material is also released from the ink ribbon 1 towards the recording head at the same time. But for the groove 6a, the electro-conductive thermo-fusible material released from the surface of the ink ribbon 1 would adhere in a layer to the recording head, so that the recording electrode 3 and the return electrode 5 would be electrically connected and the quality of recorded images would be significantly degraded or in fact become impossible.

In the present invention, any kind of ink ribbon containing a thermal-transferable ink material which is fused and becomes transferable when heated at a predetermined temperature can be employed. The following ink ribbons are particularly suitable for use in the non-impact recording apparatus according to the present invention:

(a) Single layer type ink ribbon, which ink ribbon itself is electroconductive and thermal-transferable, and comprises a thermo-fusible resin (for example, butadiene-styrene copolymer, acrylic resin, polycarbonate, polyester resin, polyvinyl butyral resin or cellulose acetate resin) a pigment and/or an electroconductive material (for example, carbon black) uniformly dispersed in the thermo-fusible resin, and, if necessary, with other additives, such as plasticizers and stabilizers, also dispersed therein. When this ink ribbon is employed, the ink ribbon itself is fused by the Joule's heat generated within the ink ribbon and is transferred to the recording medium.

(b) Double layer type ink ribbon, which comprises a base layer and an electroconductive thermal-transferable ink layer formed on the base layer. The ink layer is lower in electric resistivity than the base layer and comprises a thermo-fusible or thermo-plastic resin (for example, polycarbonate, polyester, butadiene-styrene copolymer, acrylic resin or polyvinyl butyral resin or cellulose acetate resin) or a thermo-fusible binder agent (for example, waxes), and a pigment and/or an electroconductive agent (for example, carbon black) and, if necessary, with other additives, such as plasticizers and stabilizers, also dispersed therin. When this ink ribbon is employed, only the ink layer is transferred to the recording medium by the Joule's heat.

In the above-described ink ribbon, carbon black serves as an electroconductive material as well as a pigment.

Referring to FIGS. 4 through 11, there are shown other examples of the recording head for use in the present invention.

Figure 4:
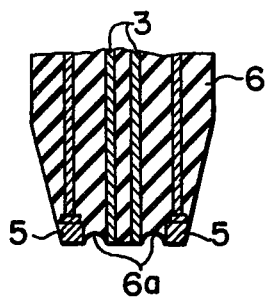
FIG. 4 is a sectional view of another example of a recording head comprising a recording electrode and a return electrode for use in the non-impact recording apparatus shown in FIG. 1.
Figure 5:
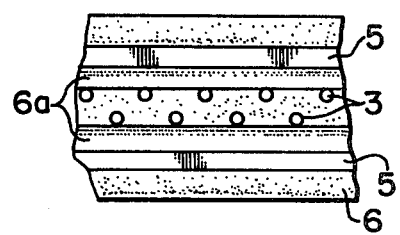
FIG. 5 is a partial cut-away bottom view of the recording head shown in FIG. 4.

The recording head shown in FIGS. 4 and 5 includes the recording electrode 3 consisting essentially of two rows of staggered recording styli, and two return electrodes 5 disposed on the opposite sides of the recording electrode 3. The recording electrode 3 and the two return electrodes 5 are integrally supported by the support member 6. Between each row of the recording styli and each of the return electrodes 5 adjacent thereto, in the contact portion of the recording head, there is formed the groove 6a.

Figure 6:
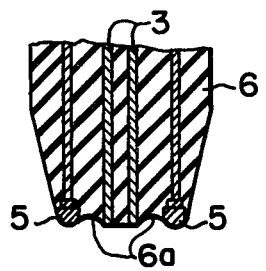
FIG. 6 is a sectional view of a further example of a recording head comprising a recording electrode and a return electrode for use in the non-impact recording apparatus shown in FIG. 1.
Figure 7:
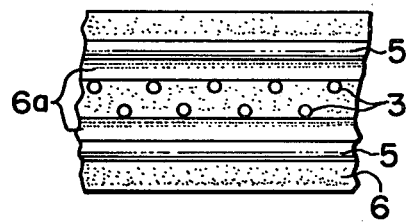
FIG. 7 is a partial cut-away bottom view of the recording head shown in FIG. 6.

The recording head shown in FIGS. 6 and 7 has the same structure as that of the recording head shown in FIGS. 4 and 5. The only difference between the two recording heads is that the contact portion of each of the return electrodes 5 shown in FIGS. 6 and 7 has a curved surface.

Figure 8:
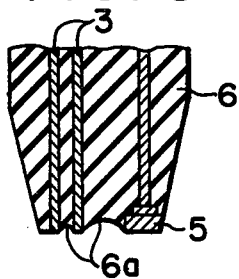
FIG. 8 is a sectional view of a further example of a recording head comprising a recording electrode and a return electrode for use in the non-impact recording apparatus shown in FIG. 1.
Figure 9:
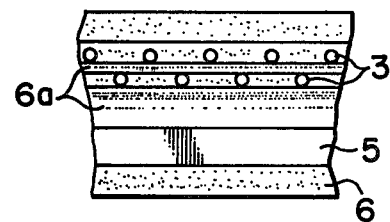
FIG. 9 is a partial cut-away bottom view of the recording head shown in FIG. 8.

The recording head shown in FIGS. 8 and 9 includes the recording electrode 3 consisting essentially of two rows of staggered recording styli, and one return electrode 5, which are integrally supported by the support member 6. Between the two rows of the recording styli, and between the return electrode 5 and the row of recording styli adjacent to the return electrode 5, there are formed the grooves 6a.

Figure 10:
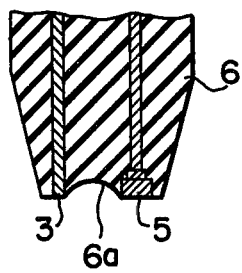
FIG. 10 is a sectional view of a still further example of a recording head comprising a recording electrode and a return electrode for use in the non-impact recording apparatus shown in FIG. 1.
Figure 11:
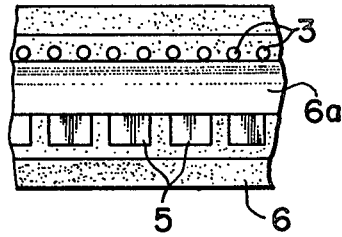
FIG. 11 is a partial cut-away bottom view of the recording head shown in FIG. 10.

The recording head shown in FIGS. 10 and 11 has the same structure as that of the recording head shown in FIGS. 2 and 3. The only difference between the two recording heads is that the return electrode 5 in the recording head shown in FIGS. 10 and 11 is segmented into a plurality of parts.

The above-described recording heads have the same operating performance with respect to the formation of image dots.

The advantages of the present invention will now be shown by referring to the following embodiments and experiments.

EXAMPLE 1

Non-impact recording was performed by use of a nonimpact recording apparatus of the type as shown in FIGS. 1 through 3, in which the diameter of each recording stylus of the recording electrode 3 was 0.1 mm, the styli were arranged in a row with a density of 3 styli/mm, the thickness of the return electrode 5 was 1 mm, the space between the row of the recording styli and the return electrode 5 was 1 mm, and the support member 6 was made of an epoxy resin, with a groove 6a formed between the recording electrode 3 and the return electrode 4 as shown in FIG. 2.

In this example, a double-layer-type ink ribbon comprising a base layer and an ink layer formed on the base layer was employed. The base layer had a thickness of 12 μm and a surface resistivity of 30 KΩ, which was prepared by mixing 70 wt. % of polyvinyl butyral with a softening point of 200° C. and 30 wt. % of carbon black. The ink layer had a thickness of 5 μm and a surface resistivity of 5 KΩ, which was prepared by mixing 60 wt. % of paraffin wax with a melting point of 60° C. and 40 wt. % of carbon black and then by coating the mixture on the base layer.

As the recording medium, a sheet of high quality paper was employed.

The double-layer-type ink ribbon was superimposed on the sheet of paper. The recording head was scanned over the paper in contact therewith, under application of a single pulse voltage of 300 V with a pulse width of 1 msec between the recording electrode 3 and the return electrode 5. The application of the pulse voltage was intermittently done 100 times. The result was that a circular dot with a diameter of approximately 100 μm was formed stably and clearly on the paper immediately below each stylus of the recording electrode 3. The electroconductive thermo-fusible ink material did not adhere to or accumulate in the groove 6a of the recording head.

EXAMPLE 2

This was a comparative example with respect to Example 1. In this comparative example, the recording head 3 employed in Example 1 was replaced by a comparative recording head which did not include the groove 6a, but had a flat portion instead, and the other features were exactly the same as those of the recording head 3.

Image dots were formed under the same conditions as in Example 1. By the time the single pulse voltage had been applied 10 times, the diameter of each image dot was approximately 150 μm, which was approximately 1.5 times the size of the dots formed in Example 1. When the pulse voltage was then applied once again, the size of each image dot was 2 to 3 times the diameter of the stylus. At the same time, it was observed that the electroconductive thermo-fusible ink material adhered to the portion between the recording electrode and the return electrode of the comparative recording head.

What is claimed is:

1. In a non-impact recording apparatus comprising (i) a recording head comprising (a) a recording electrode having a plurality of recording styli, (b) a return electrode, and (c) means including an electrically insulating support member receiving said recording electrode and said return electrode for supporting integrally said recording electrode and said return electrode with a predetermined distance therebetween so that they are substantially parallel to each other, with the contact area with an ink ribbon containing an electroconductive thermo-fusible ink material of said recording electrode being smaller than the contact area with the ink ribbon of said return electrode, and (ii) an image-delineating signal application means for applying image-delineating electric current between selected recording styli in said recording electrode and said return electrode so as to generate Joule's heat in the portions of the ink ribbon immediately below said recording styli and to soften said ink material in image patterns, thereby transferring the softened or fused ink material of the ink ribbon in image patterns to a recording medium, the improvement including means forward on the side of said recording head adapted to be in contact with the surface of said ink ribbon for providing a groove portion out of contact with the surface of the ink ribbon between said recording electrode and said return electrode.

2. A non-impact recording apparatus as claimed in claim 1, wherein said recording styli are arranged in a plurality of rows and staggered, and a groove portion which is essentially the same as said groove portion is formed between said rows of recording styli.

3. A non-impact recording apparatus as claimed in claim 1, wherein said return electrode is divided into two return electrode members which are arranged on opposite sides of said recording electrode.

4. A non-impact recording apparatus as claimed in claim 1, wherein said return electrode consists essentially of a plurality of segmented return electrode members.

5. A non-impact recording apparatus as claimed in claim 1, wherein said return electrode has a flat contact portion which is in contact with the surface of said ink ribbon.

6. A non-impact recording apparatus as claimed in claim 1, wherein said return electrode has a curved contact portion which is in contact with the surface of said ink ribbon.

7. In a non-impact recording apparatus having a recording head formed of an electrically insulating material and having a recording electrode formed of a plurality of styli and a return electrode spaced from said styli, said recording electrode and said return electrode being each embedded within said electrically insulating material and having portions exposed on one surface thereof, the improvement wherein portions of said recording head between said recording electrode and return electrode are withdrawn from the plane of the exposed portions thereof to minimize contact with said recording head of any inking ribbon brought between said electrodes.

8. A non-impact recording apparatus according to claim 7, wherein said recording electrode includes two staggered rows of recording styli spaced from a return electrode, and the portions of said recording head between said staggered rows of styli and the portions of said recording member between the two rows of styli and said return electrode are withdrawn from the plane of the exposed electrodes to minimize contact with said recording head of any inking ribbon brought between said electrodes.

9. A non-impact recording apparatus according to claim 7, wherein said return electrode is formed in a plurality of segments.

10. A non-impact recording apparatus according to claim 7, wherein said recording electrode is formed of a plurality of styli arranged in two staggered rows, and a separate return electrode is provided for each of said rows of styli, the portions of said recording head between each of said rows of styli and its associated return electrode being withdrawn from the plan of the exposed portions of these electrodes to minimize contact with such recording head of any inking ribbon brought between said electrodes.

11. A non-impact recording apparatus according to claim 10, wherein the exposed surface of each of said return electrodes is curved outwardly.

* * * * *